May 22, 1951 P. A. SMITH 2,553,791
PULLEY
Filed Nov. 19, 1945 2 Sheets-Sheet 1
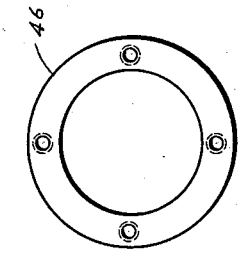
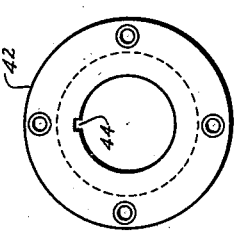
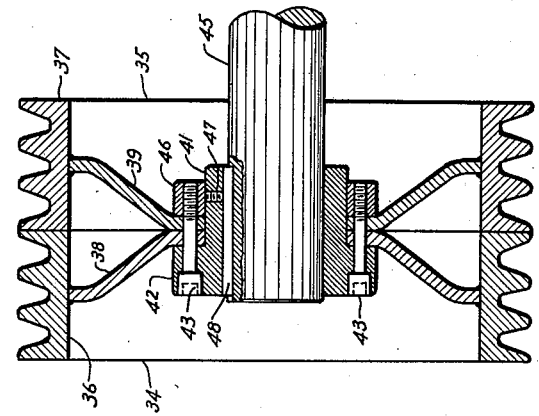
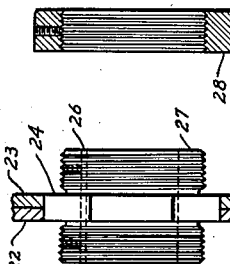
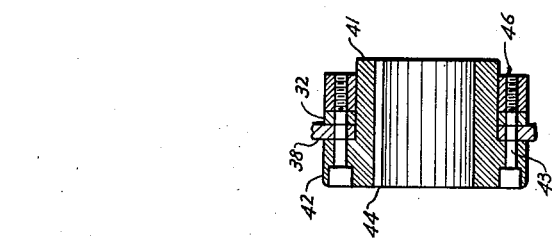
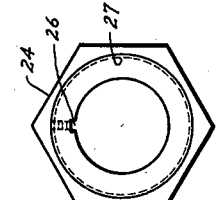
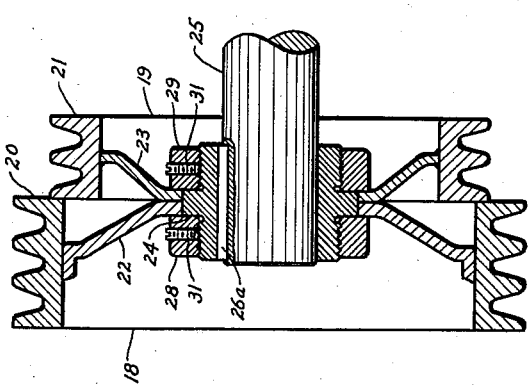
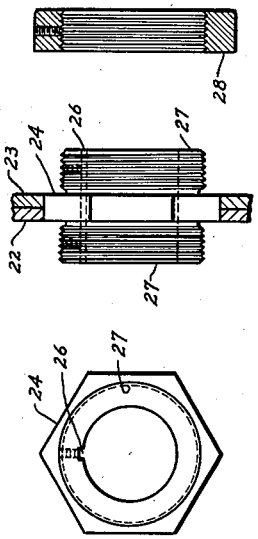
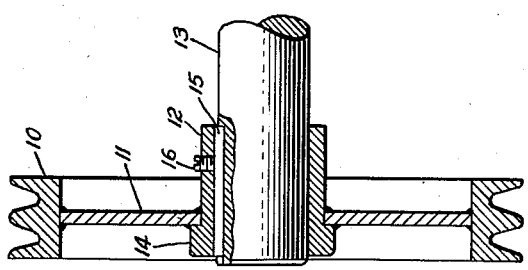
INVENTOR
PAUL A. SMITH
BY
Archworth Martin
ATTORNEY May 22, 1951 P. A. SMITH 2,553,791
PULLEY Filed Nov. 19, 1945 2 Sheets-Sheet 2

INVENTOR
PAUL A. SMITH
BY Archworth Martin
ATTORNEY

Patented May 22, 1951

2,553,791

UNITED STATES PATENT OFFICE 2,553,791

PULLEY

Paul A. Smith, Mars, Pa.

Application November 19, 1945, Serial No. 629,428

3 Claims. (Cl. 74—230.3)

My invention relates to pulleys or sheaves and more particularly to those of the grooved type for use with V-belts, rope drives and the like.

One object of my invention is to provide a pulley of the type referred to which can conveniently be formed from material of various standard shapes instead of by casting and which will be statically balanced and of greater strength for material of a given weight.

Another object of my invention is to provide pulley units and mountings therefor of such form that they can conveniently be arranged in multiples suitable for a desired number of belts, and wherein the sheave units entering into a given multiple arrangement can be of different diameters, and of different groove size and spacing.

Still another object of my invention is to provide a pulley structure that can readily be applied to shafts of different diameters.

A further object of my invention is to provide an improved method of forming pulleys and particularly the grooved rims thereof.

Figure 10:
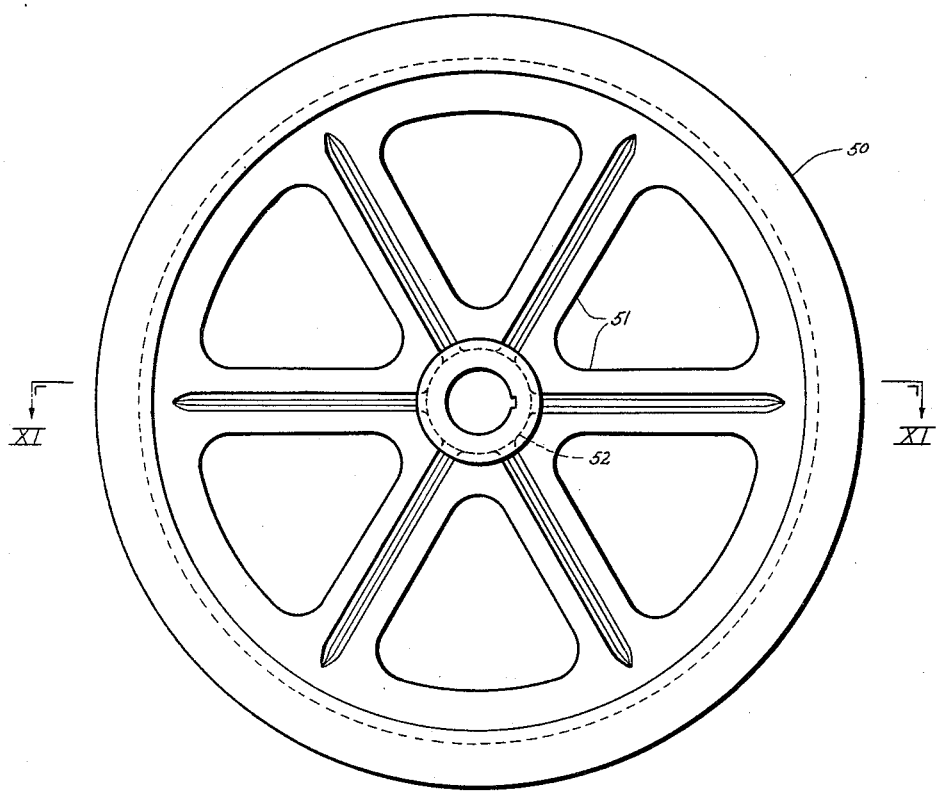
Figure 12:
Figure 11:
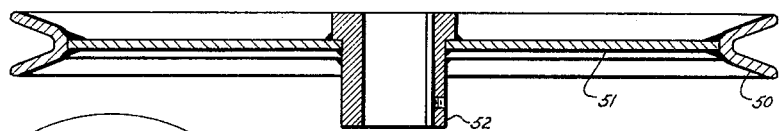
Figure 1:
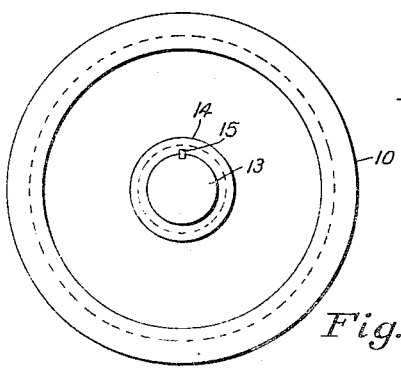

Some of the forms which my invention may take are shown in the accompanying drawings wherein Figure 1 is a side view of one form of pulley embodying my invention; Fig. 1a is a sectional view thereof; Fig. 2 shows a modification thereof; Fig. 3 is a side view of the hub of Fig. 2; Fig. 4 is an end view thereof; Fig. 5 is a sectional view showing one of the clamping collars of Fig. 2; Fig. 6 is a cross sectional view of a modification of the structure of Fig. 2; Fig. 7 is a sectional view showing the hub of Fig. 6; Fig. 8 is an end view thereof; Fig. 9 is a view showing the clamping collar of Figs. 6 and 7; Fig. 10 is a side view showing still another form of pulley; Fig. 11 is a view taken on the line XI—XI of Fig. 10, and Fig. 12 is a sectional view through one of the spokes of Fig. 10.

Referring first to Fig. 1, I show a pulley having a rim 10, a web plate 11 and a hub 12 all welded together and mounted on a shaft 13. The hub has an annular shoulder 14 that facilitates the assembling of the web 11 thereon, previous to welding the web or disc 11 to the hub, and also serves to brace and stiffen the web. The hub has a key-way for receiving a key 15 which will anchor it to the shaft 13, a set screw 16 having threaded engagement with the hub and serving to hold the key against accidental displacement.

The hub can suitably be formed of bar stock or heavy wall tubing cut or forged to the required shape. The web 11 can be made of plate cut to the desired contour, and may be dished or ribbed for strength in the larger diameters of pulleys.

The rim 10 can conveniently be fashioned from a rolled milled, or formed section, bar stock, or thick walled tubing and then welded to the web.

Referring now to Figs. 2 to 5, I show an arrangement whereby one or more pulleys can be mounted on a single hub, depending upon the number of belts to be accommodated thereon, and wherein the pulleys may be all of the same diameter or of different diameters and may have grooves of different sizes and spacing to accommodate belts of different cross sectional areas. Also the pulley or pulleys are readily interchangeable with hubs of various internal diameters to fit shafts of different diameters.

In this arrangement, two pulleys 18 and 19 are shown, having rims 20 and 21 respectively which may be formed in the same manner as the rim 10 of Fig. 1. As above indicated, these pulleys 18 and 19 may be of different diameters and be provided with desired numbers of belt grooves of the same or different spacing and depth to accommodate belts of different cross section. In the pulley 18, its web 22 is shown as flanged at its peripheral edge and pressure welded or spot welded to the rim, while the pulley 19 has its web 23 secured to the rim by deposited weld metal. The central portions of the webs 22—23 have hexagonal openings therethrough to fit upon the hexagonal edge of the peripheral rib on the hub member 24 as shown more clearly in Fig. 3, the hub being provided with a central bore for fitting it on a shaft 25 and having a key-way at 26 whereby it may be keyed to the shaft. The hub has two exteriorly threaded tubular extensions 27 to receive threaded collars 28 and 29 than can be screwed into place to hold the pulley discs 22—23 in place. Set screws 31 are provided to hold the collars 28 and 29 against unscrewing and a key 26a is provided to hold the pulley against turning on the shaft. When only a single pulley is required, as with either the pulley 18 or the pulley 19, a spacer collar or filler such as the spacer ring 32 of Fig. 7 will be placed on the hub instead of one of the pulley webs 22 or 23.

By simply providing hubs 24 of given peripheral dimensions to receive pulleys and threaded collars of standard sizes but having bores of various diameters, pulleys of standard sizes can readily be applied to shafts of different diameters.

In Figs. 6 to 9, I show pulleys 34 or 35 having grooved rims 36 and 37 respectively that may be formed in the same manner as the rim of Fig. 1 and which pulleys may be of the same or different diameters and each having a desired number and size of grooves. The webs 38 and 39 of the pulleys are circularly-apertured at their central portions to receive a hub 41 that has shouldered portion 42. The webs 38—39 and the enlarged head 42 of the hub have holes to receive screws 43, the hub portion 42 being recessed or countersunk to accommodate the screw heads. The hub is also provided with a keyway 44 as shown in Figs. 7 and 8 whereby it will be keyed to a shaft 45.

A collar 46 is threaded to receive the inner ends of the screws 43 and thereby serves to clamp the inner portions of the webs 38—39 together and hold them in place. Where only one pulley is to be used, a filler plate such as 32 will be substituted for one of the webs. Since the hub is keyed to the shaft and the screws 43 extend through holes in the enlarged portion 42 of the hub, and through holes in the webs 38—39, the pulleys are held against turning on the shaft. A set screw 47 in the hub secured the key 48 in place and locks the hub to the shaft.

The pulleys 34—35 are so formed that when they are first placed in position on the hub, their rims 36—37 will abut one another and the inner perforated edges of the webs 38—39 will be spaced slightly apart. Upon turning of the screws to bring the collar 46 into tightly clamped position against the outer side of the web 39, the inner portions of the webs will be drawn together and thereby produce a tension that will maintain the rims 36—37 in tight fitting engagement with each other. This is also true of Fig. 2.

In this arrangement, as in that of Fig. 2, a set of pulleys of standard sizes can be used on shafts of different diameters, simply by applying them to hubs of suitable internal diameters but all of the same external dimensions and screw holes.

It will be understood that in some instances, as in the case of Figs. 1 and 2 for example, the body portion of the pulley may be in the form of spokes as in Figs. 10—11—12, instead of the discs 11, 22 or 23, and may be of single groove construction with light weight, ribbed spokes, for accomplishing maximum strength with least weight. In these Figures 10, 11, and 12, the rim 50 may have spokes 51 welded thereto in the same manner as in various of the other figures, and the spokes welded or otherwise secure to a hub 52.

Whereas the rims of Figs. 1, 2 and 6 will preferably be made of thick-walled tubing whose belt grooves are formed therein by heating short-length tubes and then placing them on a mandrel while rolling the grooves in their peripheral surfaces, the rim 50 will be made of thinner walled tubing bent to approximately V-form, in suitable dies, or rolled to such form.

I claim as my invention:

1. A pulley comprising a pair of rim members each having grooves formed peripherally therein, and having a flexible web disposed within the rim and secured thereto, a hub adapted for connection to a shaft, and means on the hub for detachably connecting the pulley webs thereto and drawing the webs against one another, each web being so positioned in its rim that the adjacent edges of the rims can have abutting engagement with one another while their webs are in slightly-spaced apart relation.

2. A pulley structure comprising a hub of tubular form adapted to fit on a shaft, a pair of pulley rims each having a web which is dished at its mid portion toward the other web and surrounding the hub, means for preventing rotative motion of the webs on the hub, and means on the hub for holding the mid portions of the webs against one another, the said means comprising a pair of clamping collars having threaded engagement with the end portions of the hub.

3. A pulley structure comprising a pair of pulleys each having a rim and a web that has a central opening, the central portions of the webs being axially extended into face-to-face engagement with one another, a hub having a central opening to receive a shaft and a peripheral area of non-circular contour having removable but close-fitting engagement with the walls of the web openings, and clamping means on the hub, for rigidly holding said webs against one another and against displacement relative to the hub, in axial directions.

PAUL A. SMITH.

REFERENCES CITED

The following references are of record in the file of this patent:

UNITED STATES PATENTS

| Number | Name | Date |
|---|---|---|
| 337,024 | Siebert | Mar. 2, 1886 |
| 414,972 | Case | Nov. 12, 1889 |
| 792,768 | Forker | June 20, 1905 |
| 917,450 | Jones et al. | Apr. 6, 1909 |
| 1,357,266 | Wood | Nov. 2, 1920 |
| 1,371,212 | Adams et al. | Mar. 15, 1921 |
| 1,380,218 | Lachman | May 31, 1921 |
| 1,494,409 | Bidle | May 20, 1924 |
| 1,940,617 | Temple | Dec. 19, 1933 |
| 2,156,920 | Mitchell | May 2, 1939 |
| 2,269,821 | Kemphert et al. | Jan. 13, 1942 |
| 2,417,467 | Bryant, Jr. | Mar. 18, 1947 |